US008633950B2

(12) United States Patent
Okishiro et al.

(10) Patent No.: US 8,633,950 B2
(45) Date of Patent: Jan. 21, 2014

(54) IMAGE DISPLAY DEVICE

(75) Inventors: Kenji Okishiro, Kawasaki (JP);
Toshiaki Kusunoki, Tokorozawa (JP);
Kenichi Yamamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 12/961,639

(22) Filed: Dec. 7, 2010

(65) Prior Publication Data
US 2011/0134160 A1 Jun. 9, 2011

(30) Foreign Application Priority Data
Dec. 9, 2009 (JP) ................. 2009-279458

(51) Int. Cl.
*G09G 5/10* (2006.01)
*G09G 5/02* (2006.01)
*H04N 5/202* (2006.01)

(52) U.S. Cl.
USPC ............. 345/690; 345/589; 348/674

(58) Field of Classification Search
None
See application file for complete search history.

(56) References Cited

U.S. PATENT DOCUMENTS

2010/0165002 A1* 7/2010 Ahn .............................. 345/690
2010/0201887 A1* 8/2010 Bakhmutsky ................. 348/674

FOREIGN PATENT DOCUMENTS

| JP | 2002-196744 A | 7/2002 |
| JP | 2003-333368 A | 11/2003 |
| JP | 2004-7076 A | 1/2004 |

* cited by examiner

*Primary Examiner* — Alexander S Beck
*Assistant Examiner* — Ibrahim Khan
(74) *Attorney, Agent, or Firm* — Mattingly & Malur, PC

(57) ABSTRACT

An image display device for special uses which improves a color resolution of a particular color and increases a color reproducibility is provided. In the image display device, an area in which a gradient is gentle is provided to a partial region of a gamma curve denoted by a relationship of an input value (gray level) and an output value (luminance relative value) so that chromaticity points on chromaticity coordinates are unevenly distributed, thereby improving a chromatic resolving power (color resolution) of a particular color. In this manner, the color reproducibility of special monitors which display images of a particular color range represented by a monitor for remote metical care and a monitor for surgical operation can be improved.

8 Claims, 17 Drawing Sheets

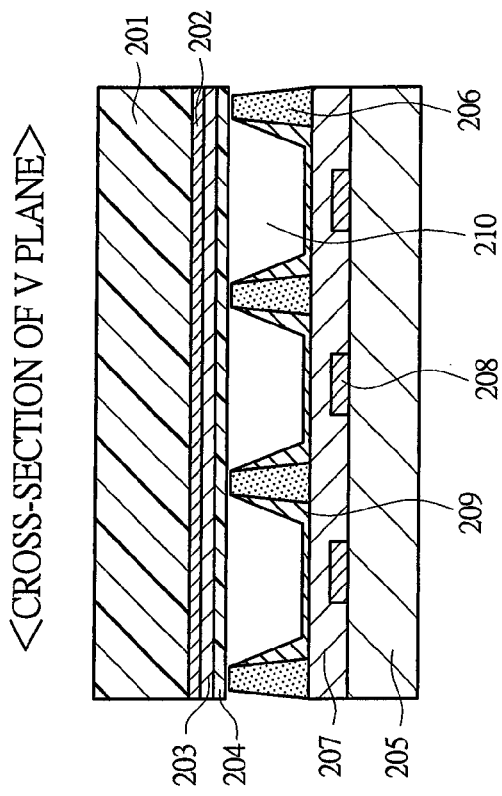
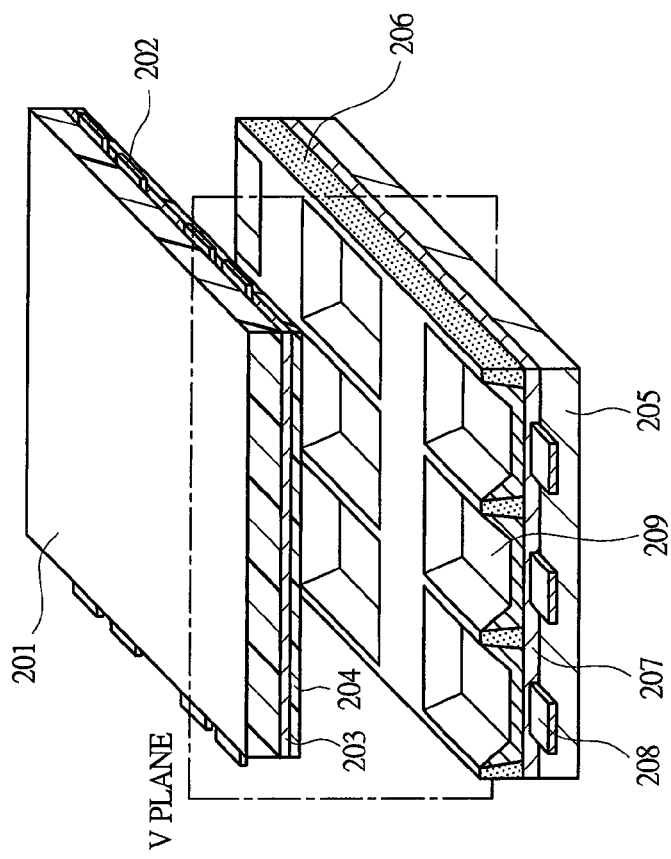
FIG. 18A
FIG. 18B
<CROSS-SECTION OF V PLANE>

1

IMAGE DISPLAY DEVICE

CROSS-REFERENCE TO RELATED APPLICATION

The present application claims priority from Japanese Patent Application No. 2009-279458 filed on Dec. 9, 2009, the content of which is hereby incorporated by reference into this application.

TECHNICAL FIELD OF THE INVENTION

The present invention relates to an image display device and a technology of improving chromatic resolving power (color resolution) in accordance with a picture source.

BACKGROUND OF THE INVENTION

Image display devices are used in various fields such as TVs, mobile phones, monitors for personal computers, digital signages, and other industrial monitors. In recent years, usages of such image display devices have been expanded, and opportunities of using image display devices for, for example, display devices in video-conference systems, and further, using image display devices on the medical front have been increased. Among such image display devices, required performances are largely different from generally used image display devices such as TVs and monitors for personal computers. In the future, for the image display devices to accommodate to and make inroads in broader fields, it is necessary to satisfy display characteristics corresponding to an intended use of a corresponding field and also a technology development aiming at that satisfaction is necessary.

Typical image display devices for medical use include an electronic medical chart monitor, an X-ray image monitor, a monitor for surgical operation, a monitor for remote medical care, etc. A specific example will be explained by, for example, the monitor for remote medical care. As the name represents, the monitor for remote medical care is an image display device used in what they call "remote medical care" for doctors to diagnose patients from a distance. Particularly, as a shortage of doctors is being pointed out in this day and age, a system for seeing doctors regardless of places is mandatory. In such a remote medical care, based on a picture of a patient shown on a monitor, a doctor makes various diagnoses. To grasp the status of the patient, it is necessary to grasp the color of the patient's face, a status of the patient's skin, and a status of an inflamed area in detail, and diagnoses of symptoms etc. are made based on observation results of these factors. In this situation, the picture itself shown on the monitor is one piece of data for the doctor to know the status of the patient. Therefore, the color, contour and texture of human skin are necessary to be expressed on the monitor. Such a request in characteristics is a special request and different from those image display devices such as TVs.

Also, video-conference systems which have been spread in recent years are systems which bi-directionally display images of both sides in conference rooms at different places on image display devices via the Internet or a telephone line. The video-conference system artificially creates an atmosphere such that both are debating in the same conference room. As to such an image display device, it is desired to express the color and texture of skin and presence etc. of the other persons in detail.

Note that bi-directional visual systems such as medical systems like the monitor for remote medical care and a monitor for surgical operation etc., and the video-conference system are getting easier to install than before as the Internet has been popularized. There is a trend of further broadening the uses in the future.

Image quality of an image displayed on an image display device such as colors and brightness etc. are determined by a gamma correction. Gamma correction means a correction operation by adjusting a relative relation of a picture signal (input value) from an external device and a signal (output value) upon display on the image display device so that people can watch the image without a feeling of strangeness. Generally, the input value is a gray level "x" in the picture signal, and the output value is expressed by a luminance relative value Y(x) when a luminance at a maximum gray level $x_{max}$ is 1. A curve illustrating a relationship between the input value and the output value is called a "gamma curve."

Currently, an 8-bit signal is used as a general picture signal, and the gray level "x" is expressed by an integer ranging from 0 to 255. For example, when a signal is an n-bit signal, the gray level "x" is an integer value ranging from 0 to $2^n-1$. And, a luminance relative value Y(x) is accordingly determined in a one-to-one relationship. When one gray level "x" is determined, one luminance relative value Y(x) corresponding to the gray level "x" is determined. While the gamma curve is a curve illustrating a relationship of the gray level and the luminance relative value, the gamma curve is not actually a continuous line on the coordinate but is a set of discrete points.

Conventionally, the gamma curve has been approximately expressed by a curve of $Y=(x/(2^n-1))^{2.2}$. This is because it has been empirically known that, by using the relationship, humans feel that the image is in a high image quality when they view TV pictures etc.

SUMMARY OF THE INVENTION

As explained above, as to image display devices for special uses such as medical systems like the monitor for medical care and a monitor for surgical operation etc., and image display devices in the bi-directional visual system like the video-conference system, it is necessary to improve the chromatic resolving power (color resolution) of a particular color and to increase the color reproducibility.

Accordingly, a preferred aim of the present invention is to provide an image display device which improves the color resolution of a particular color and increases the color reproducibility for image display devices for special uses.

The above and other preferred aims and novel characteristics of the present invention will be apparent from the description of the present specification and the accompanying drawings.

The typical ones of the inventions disclosed in the present application will be briefly described as follows.

More specifically, a summary of a typical one of the inventions is an image display device which displays pictures using a picture signal from an external device as an input value and using an output value obtained by correcting or converting the input value by a gamma curve, the image display device having a region having a gentle gradient in a partial region of the gamma curve expressed by a relationship of the input value (gray level) and the output value (luminance relative value) and having an uneven distribution of chromaticity points on a chromaticity coordinate by providing the region, so that a color resolution of a particular color is improved. The image display device has the following configuration. More specifically, the input value is a gray level "x" (an integer satisfying $0 \leq x \leq 2^n-1$, here, n is a number of bits) of the picture signal, the output value is a luminance relative value Y(x)

standardized for having a luminance being 1 at a maximum gray level $x_{max}$ (=$2^n-1$), and the gray level (x) and the luminance relative value Y(x) have a one-to-one relationship, and the image display device having a gamma curve being adjusted such that: when gradients $R(x_i-1, x_i)$ and $R(x_i, x_i+1)$ are defined by using (Equation 1) and (Equation 2), there is at least one or more gray levels $x_i$ satisfying (Equation 3) in a range between a gray level of 0 and the maximum gray level $x_{max}$; and, when gradients of $R(x_j-1, x_j)$ and $R(x_j, x_j+1)$ are defined by using (Equation 4) and (Equation 5), there are at least one or more gray levels $x_j$ satisfying (Equation 6) in a range between the gray level $x_i$ and the maximum gray level $x_{max}$.

$$R(x_i - 1, x_i) = \frac{Y(x_i) - Y(x_i - 1)}{x_i - (x_i - 1)} = Y(x_i) - Y(x_i - 1) \quad \text{(Equation 1)}$$

$$R(x_i, x_i + 1) = \frac{Y(x_i + 1) - Y(x_i)}{(x_i + 1) - x_i} = Y(x_i + 1) - Y(x_i) \quad \text{(Equation 2)}$$

$$0 < R(x_i, x_i + 1) < R(x_i - 1, x_i) \quad \text{(Equation 3)}$$

$$R(x_j - 1, x_j) = \frac{Y(x_j) - Y(x_j - 1)}{x_j - (x_j - 1)} = Y(x_j) - Y(x_j - 1) \quad \text{(Equation 4)}$$

$$R(x_j, x_j + 1) = \frac{Y(x_j + 1) - Y(x_j)}{(x_j + 1) - x_j} = Y(x_j + 1) - Y(x_j) \quad \text{(Equation 5)}$$

$$0 < R(x_j, x_j - 1) < R(x_j + 1, x_j) \quad \text{(Equation 6)}$$

The effects obtained by typical aspects of the present invention will be briefly described below.

That is, an effect achieved by a typical one of the inventions is, particularly, an image display device capable of increasing color reproducibility by having gentle gradients of grayscale regions in parts in a gamma curve expressed by a relationship of an input value (gray level) from a picture signal of the image display device and an output value (luminance relative value), and improving a color resolution of a particular color.

BRIEF DESCRIPTIONS OF THE DRAWINGS

FIG. 18A is an enlarged perspective view of a part of a display area illustrating a schematic structure of a general plasma display device used in a third embodiment of the present invention; and FIG. 18B is a cross-sectional view of a V plane in FIG. 18A illustrating a schematic structure of the general plasma display device used in the third embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiments, and the repetitive description thereof will be omitted. Note that, while a specific example of an image display device will be described using a flat panel display device represented by a plasma display device and a liquid-crystal display device etc. in this description, the concept of the present invention can be also used for other image display devices which display images and videos in the same manner.

<Color Expression of Image Display Device>

Generally used image display devices express various colors by using three primary colors. Generally, three colors of R (red), green (G), and blue (B) are used and the light intensity ratio of each color is changed to express various colors. For example, in a liquid-crystal display device, three pixels of RGB are taken as one unit, and the light intensity ratios of RGB are adjusted by controlling permeability of each pixel of RGB, i.e., by controlling the luminance to express various colors.

The number of colors reproducible by these image display devices is generally about 16.77 million colors. Normally, pictures expressed by an image display device are displayed in 8-bit, and 256 gray levels (0 to 255 gray levels) of the picture are allocated to each of the three primary colors, and thus there are about 16.77 million (256×256×256) patterns of combinations of light intensities of RGB, that is, an expression of about 16.77 million colors is possible. Further, when the picture is displayed in n-bit, $2^n$ gray levels are allocated to each color, and the number of expressed colors is $2^{3n}$.

Figure 14:
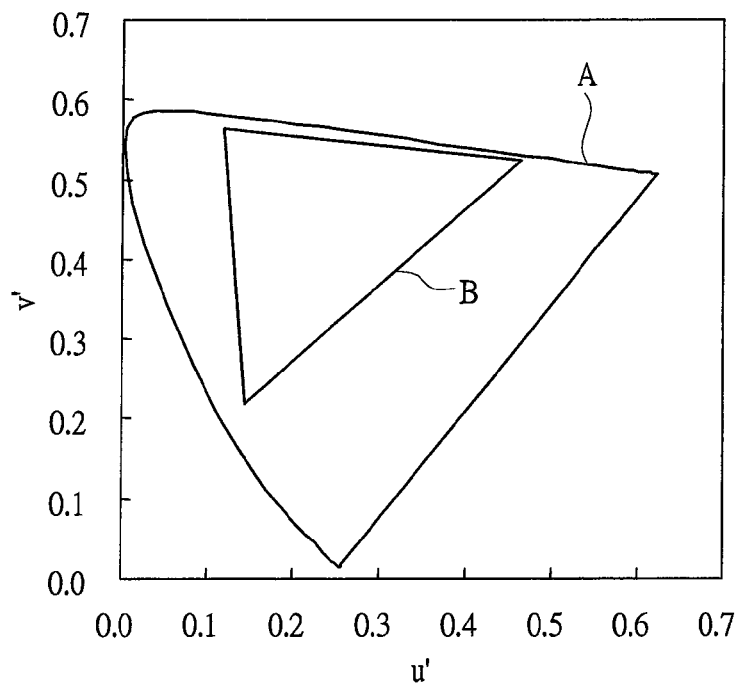
FIG. 14 is a diagram describing a u'v' chromaticity coordinate system and a color reproduction gamut of a general image display device.

These colors can be expressed by quantifying the colors on coordinates called chromaticity coordinates. For the chromaticity coordinates, a coordinate system (CIE1931) using xy and a coordinate system (CIE1976) using u'v' etc. are often used. The u'v' chromaticity coordinate system (CIE1976) is illustrated in FIG. 14. Colors sensed by humans as visible light are inside or on a line of a gamut illustrated by an area A. Also, colors reproducible by an image display device are limited to colors inside or on a line of a gamut expressed by a triangle illustrated as an area B in an image display device using the three primary colors. While each coordinate positioned at each corner of the triangle of the area B is determined by characteristics of the image display device, the coordinate is a chromaticity coordinate of the case of displaying each color of the primary colors by a single color. Further, in the image display device, colors which can be expressed cannot express all the colors positioned inside the triangle. As mentioned above, when using 8-bit color, colors which can be expressed by the image display device are 16.77 million colors, and colors of 16.77 million points (chromaticity points) positioned inside the triangle can be expressed. As TVs and general monitors display various pictures, the chromaticity points are uniformly distributed inside the triangle. For example, display of a picture of a forest may be green-themed, and display of a picture of sea or sky may be blue-themed. The distributions of chromaticity coordinates are set so that pictures having various colors are displayed.

<Color Expression in Image Display Device for Special Use>

Meanwhile, the monitors for special use as described above such as the monitor for remote medical care, the monitor for surgery operation of a medical system, and the monitor for a video-conference system show pictures which are not in wide variety as those of TVs and monitors for PC, but are mostly steady pictures. That is, colors to be shown are also mostly particular colors. For example, pictures on the monitor for remote medical care are about a face and skin or dermis of a patient. In such a situation, the colors of human skin are main colors. For example, when colors of skin of Japanese are expressed by chromaticity, they are mostly in a region illustrated as a color range A in FIG. 15A. A result of actually evaluating chromaticity of skin of Japanese under a general illumination source (three band fluorescent lamp) is illustrated in FIG. 15B. The chromaticity is substantially inside the color range A. In addition, the monitor for surgical operation often shows pictures of internal organs and blood vessels during an operation, and colors of mainly red to blue are main colors. A range in which the chromaticity is distributed is substantially a region of a color range B illustrated in FIG. 15A. In such an image display device, particular colors (color range) are expressed, and the other colors are not so much necessary. Instead, it becomes important to express subtle differences in color (color differences) of the particular colors. That is, the color range to be expressed can be narrower than the conventional chromaticity gamut of TV etc., but it is necessary to improve color resolution of the particular colors' gamut.

For example, on the monitor for remote medical care as described above, a medical condition of a patient is diagnosed from subtle differences in the color of the patient's face etc. Also, when showing blood vessels on a monitor for surgical operation, colors of arteries and veins are different, and it is necessary to express differences of respective blood vessels by sufficiently expressing the differences. While a special monitor displays only colors of a specific range, it is necessary to improve the color resolution in the same/similar color so that the differences are sufficiently expressed.

<Concept of Color Resolution Improvement>

Here, a vision of improving color resolution of a particular color will be described. To improve the color resolution, chromaticity points are densely arranged (packing) on the chromaticity coordinates. The denser the chromaticity points are, the finer the differences in color can be expressed.

As a way capable of achieving that, there is a way of increasing the number of bits in the picture display. As normal picture display devices use 8-bit signals as described above, there are displays of 256 gray levels for each color, and about 16.77 million colors can be expressed. By using an image display device of n-bit, $2^{3n}$ chromaticity points can be created for the purpose of calculation, and chromaticity points can be densely arranged in all regions on the chromaticity coordinates, and thus a fine color expression is possible. However, increasing the number of bits causes various problems such as an increase in load to a memory, an increase in power consumption, and further, an increase in costs of parts of the image display device. Accordingly, the inventors of the present invention have studied increasing the density of chromaticity points of particular colors without increasing the number of bits.

The idea can be possible in the following method. More specifically, chromaticity points are unevenly distributed only in a particular region, and chromaticity points are sparsely distributed in the other color region. In this manner, the color resolution of particular colors can be improved without increasing the number of bits. For example, when using 8-bit signals, there are 16.77 million chromaticity points, and, while they have been evenly arranged on chromaticity coordinates before, these points are arranged to be unevenly distributed only in a particular color range corresponding to particular colors which the picture shown by the image display device needs. By using such a method, a fine color expression can be achieved in a particular color range without changing the total number of chromaticity points (for example, about 16.77 million points for 8-bit signals).

The method described here is particularly effectively used in a special monitor which expresses a particular color range. For example, as to the monitor for remote medical care described above, there are many pictures to express the colors of skin such as colors of faces, and thus it is important to express differences in color of a range of skin color (for example, the color range A in FIG. 15). Therefore, chromaticity points are arranged to be dense in this range of skin colors. Since a color range of blue etc. is not much expressed in such a picture, there may not be a large influence even when chromaticity points are sparsely arranged in the blue region. Also, since there are many pictures to express colors of blood vessels on the monitor for surgical operation, by unevenly distributing chromaticity points in a color range across red to blue (for example, the color range B in FIG. 15A), subtle differences in color of blood vessels are expressed. There are few pictures to express the green range among such images, and thus there may not be a large problem in the color region even when chromaticity points are sparsely arranged.

To achieve the uneven distribution of chromaticity points, as described next, it is necessary to adjust a gamma curve. A setting of a gamma curve is the most important point of the present invention. Note that, the "gamma curve" described here is a relation curve of gray level and luminance relative value. Details will be described hereinafter.

<Setting of Gamma Curve>

<1> Gradient of Gamma Curve

Figure 16:
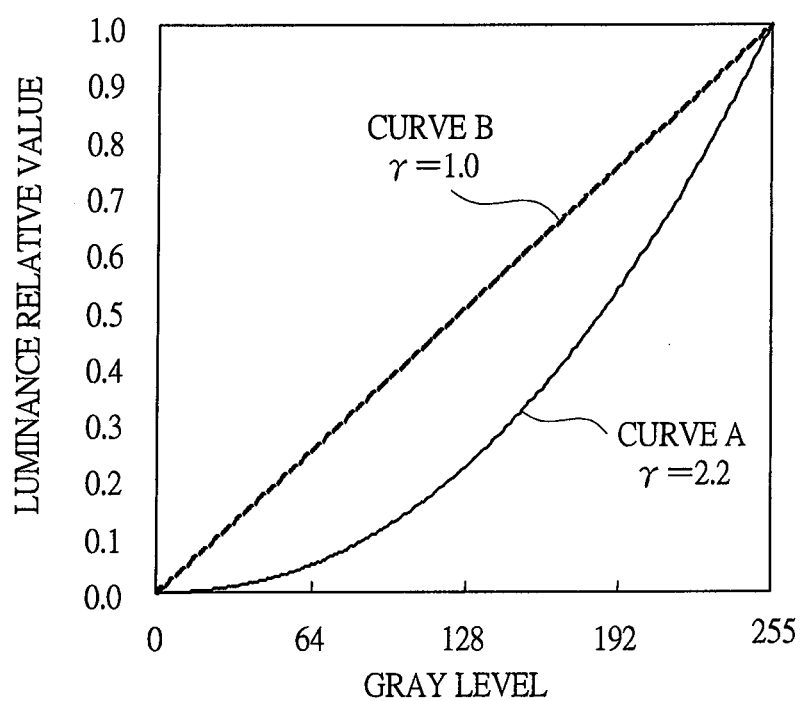
FIG. 16 is a diagram describing a gamma curve of the general image display device.

Here, settings of a gamma curve for achieving the above-described uneven distribution of chromaticity points will be described. "Gamma curve" means a relation curve of gray level and luminance relative value as illustrated in FIG. 16. As using 8-bit signals is considered in FIG. 16, gray levels of the horizontal axis range from 0 to 255, and the vertical axis is illustrated by luminance relative values when setting luminance (light intensity) in 255 grayscales as 1. When using n-bit signals, a maximum value of gray levels is $2^n-1$. In the present specification, while descriptions will be made mainly about using 8-bit signals, the same concept can be used also when the number of bits is "n."

A general gamma curve has a curved line shape swelling downward as illustrated by a curve A in FIG. 16. That is called a curve of $\gamma=2.2$, and it is said that pictures of general TVs can be beautifully viewed with the curve of $\gamma=2.2$. As mentioned above, since various pictures are displayed in TV pictures etc., expressions to be beautifully viewed in any color of picture are necessary for displaying various pictures, and a gamma curve which satisfies the condition is considered to be the curve of $\gamma=2.2$. While it will be described later, the gamma curve can be approximately expressed as (Equation 7). Meanwhile, a curve illustrated by a curve B in FIG. 16 is a curve of $\gamma=1.0$. As seen in FIG. 16, the larger the value of $\gamma$ is, the more the curve swells downward. The equations of the gamma curve mentioned here are approximate equations, and actually the gray levels are only integers, and are a group of discrete points on coordinates. In the present specification, a relationship of the gray level and the luminance relative value determined in a one-on-one manner to the gray level is called "gamma curve." In this concept, by changing the shape of the gamma curve, the density of chromaticity points described above is increased in a color range. That is, the color resolution in the color range is improved and thus a fine color expression is enabled.

Figure 1:
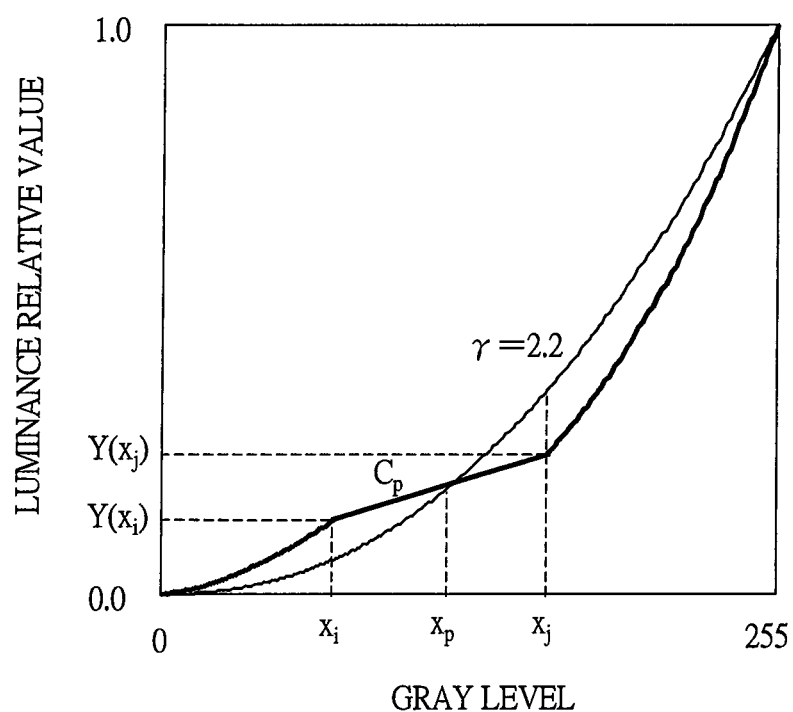
FIG. 1 is a diagram describing a gamma curve ($x_i$–$x_p$–$x_j$ is a monotone increasing straight line) of the present invention.
Figure 13:
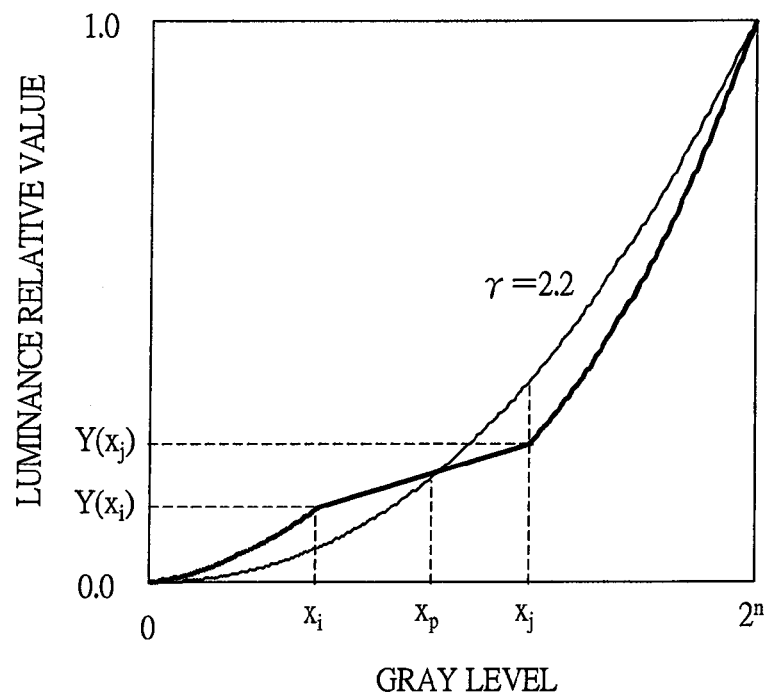
FIG. 13 is a diagram describing a gamma curve (about n-bit) of the present invention.

A major point in the present invention is, as illustrated in FIG. 1, a gradient of the gamma curve in a grayscale range (for example, a grayscale range $x_i$ to $x_j$ in FIG. 1) is gentler than in other previous and next grayscale ranges. Alternatively, a gradient of the gamma curve in the grayscale range is gentler than the gradient the conventional gamma curve ($\gamma=2.2$). While FIG. 1 is described in regard to using 8-bit signals, the concept of the present invention is the same in using n-bit signals as illustrated in FIG. 13. In this manner, by making the gradient of the gamma curve gentle, a change in luminance along with a change in grayscale when the grayscale is changed is slightly smaller than a change in luminance in the conventional way, and thus fine color combinations of RGB can be created. This means creating fine color changes, and chromaticity points are densely arranged.

Meanwhile, in the previous and next grayscale ranges (for example, grayscales 0 to $x_i$ and $x_j$ to 255 in FIG. 1) of the grayscale range ($x_i$ to $x_j$) in which the gradient is gentle, gradients are steeper than the conventional gamma curve. In such regions, the relative luminance is largely changed with respect to a change in grayscale than in the conventional gamma curve, and thus chromaticity points are in a sparse state as a result.

Figure 2A:
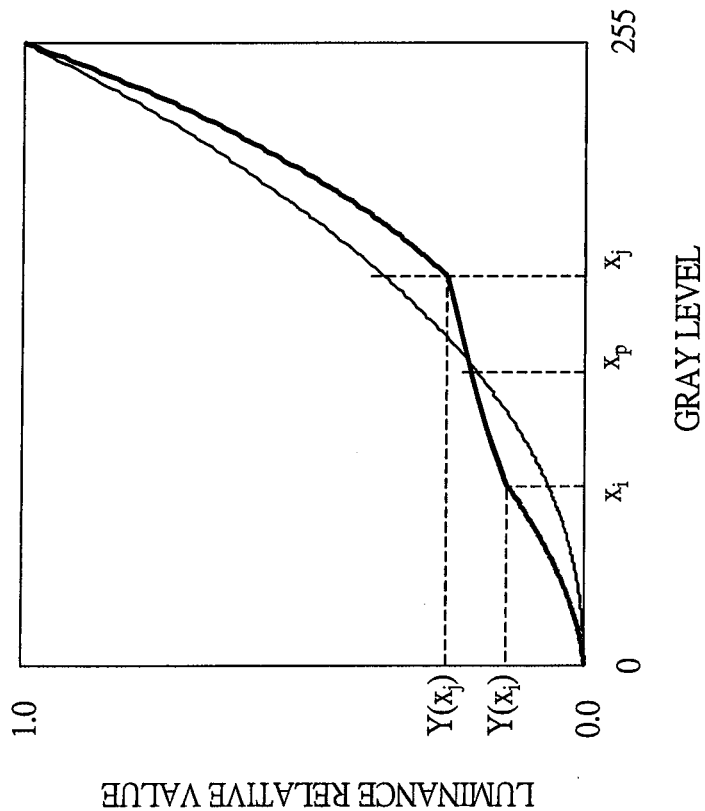
FIG. 2A is a diagram describing a gamma curve ($x_i$–$x_p$–$x_j$ is a gentle monotone increasing curve swelling downwards) of the present invention.
Figure 2B:
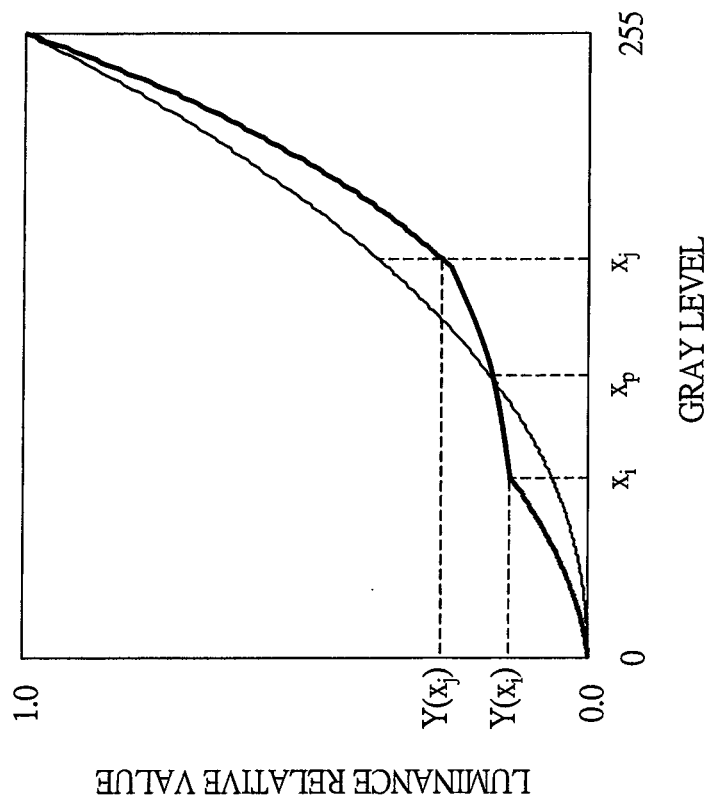
FIG. 2B is a diagram describing a gamma curve ($x_i$–$x_p$–$x_j$ is a gentle monotone increasing curve swelling upward) of the present invention.

The best point of the present invention is to improve the color resolution in a particular color range by reducing a gradient (changing amount) of the curve in a partial grayscale region of the gamma curve and sparsely arranging chromaticity points. Note that, in this concept, a gentle gradient is necessary to the curve, but the gradient will not be zero. Zero gradient means no change in luminance even when the grayscale is changed, and, in this case, the color is not changed and there is no color resolution. That is, it is equal to losing data of a picture source, and thus it has almost no meaning. The gradient between the gray levels $x_i$ and $x_j$ is gentler than the curve of conventional $\gamma=2.2$ curve, and a linear relationship as illustrated in FIG. 1 can be used in the zone. Also, as illustrated in FIGS. 2A and 2B, the curve may be a gentle curve swelling downward or a gentle curve swelling upward. An only necessary condition is that the relative luminance is monotonically increased in the range of gray level from $x_i$ to $x_j$. The luminance change will not be zero or negative in the range.

Figure 3:
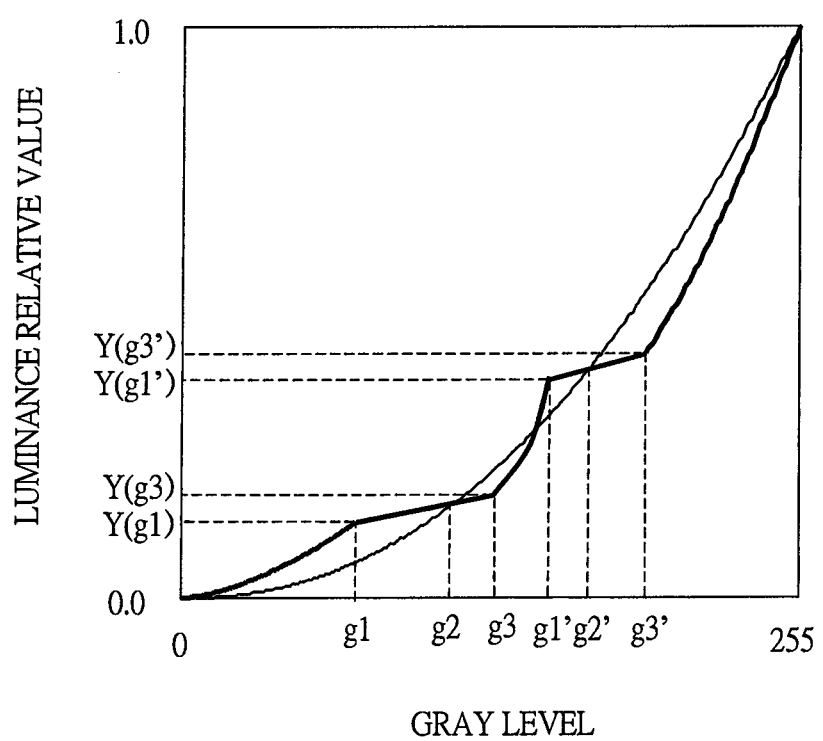
FIG. 3 is a diagram describing a gamma curve (monotone increasing at a plurality of portions) of the present invention.

Also, while details will be described later, depending on the picture, the gamma curve may have a gentle region in a plurality of grayscale ranges as illustrated in FIG. 3. In FIG. 3, in the ranges of grayscale g1 to g3 and g1' to g3', the gamma curve has regions having a gentler gradient than the conventional one.

Figure 4A:
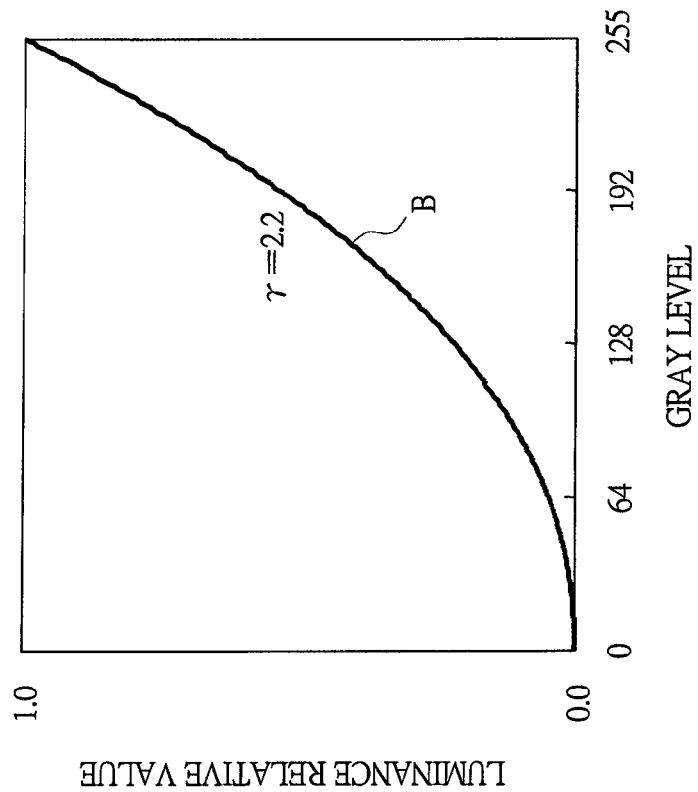
FIG. 4A is a diagram describing a gamma curve (red and green have a monotone increase) of the present invention.
Figure 4B:
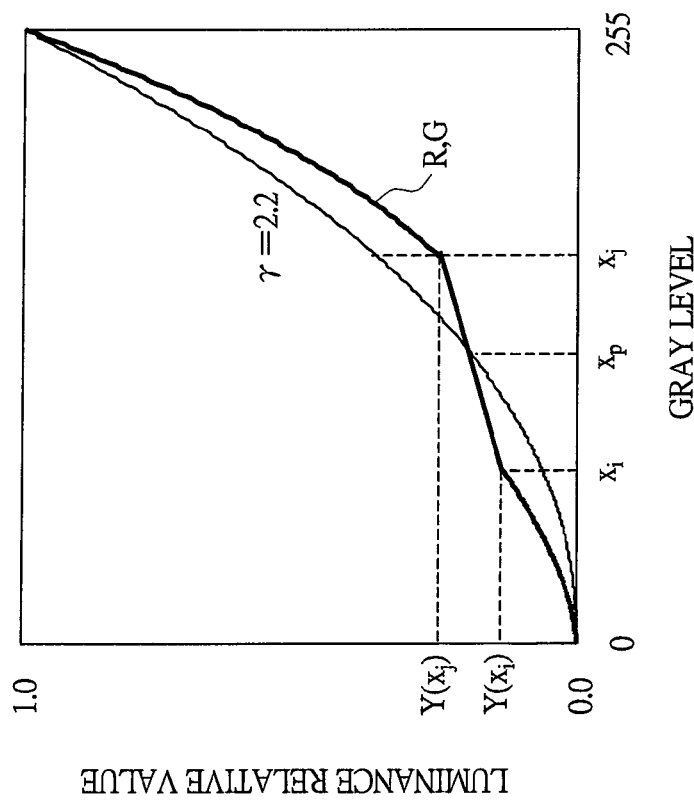
FIG. 4B is a diagram describing a gamma curve (blue does not have a monotone increase) of the present invention.

Further, these gamma curves differ by each of RGB, and their gradients may differ per color. For example, as illustrated in FIGS. 4A and 4B, the gamma curve of R and G has a gentle gradient in a grayscale range (FIG. 4A), and the gamma curve of B may be the same as the conventional one (FIG. 4B).

When studying the foregoing contents by mathematical expressions, the contents can be expressed as follows. More specifically, there are a gray level "x" and a luminance relative value Y(x) determined by the gray level x. The gray level x and the luminance relative value Y(x) are not continuous values, and, since the gray level only takes integers from 0 to $2^n-1$ (when using n-bit data), they are discrete values. Further, the gray level x and the luminance relative value Y(x) are in a one-on-one relationship. Herein, first, when a point $x_i$ of gray level is considered, previous and next coordinates to $x_i$ are $(x_1-1, Y(x_i-1))$ and $(x_i+1, Y(x_i-1))$. Here, a gradient of a connection among $(x_1-1, Y(x_i-1))$, $(x_i, Y(x_i))$, and $(x_i+1, Y(x_i-1))$ is considered. When expressing respective gradients as $R(x_i-1, x_i)$ and $R(x_i, x_i+1)$, they can be expressed by (Equation 1) and (Equation 2).

$$R(x_i - 1, x_i) = \frac{Y(x_i) - Y(x_i - 1)}{x_i - (x_i - 1)} = Y(x_i) - Y(x_i - 1) \quad \text{(Equation 1)}$$

$$R(x_i, x_i + 1) = \frac{Y(x_i + 1) - Y(x_i)}{(x_i + 1) - x_i} = Y(x_i + 1) - Y(x_i) \quad \text{(Equation 2)}$$

As described above, as the gradient of the gamma curve becomes gentler at the point of $x_i$, $R(x_i, x_i+1)$ may sometimes be smaller than $R(x_i-1, x_i)$. In addition, as described above, in the zone between $x_i$ and $x_j$, where the gamma curve needs to monotonically increase, these gradients surely have positive values. According to these points, (Equation 3) can be obtained.

$$0 < R(x_i, x_i+1) < R(x_i-1, x_i) \quad \text{(Equation 3)}$$

Next, the point of gray level $x_j$ is considered. A gradient of the gamma curve can be expressed by (Equation 4) and (Equation 5) from the previous and next coordinates. Here, since the gradient of the gamma curve needs to be larger at the point of gray level $x_j$, (Equation 6) is obtained. Of course, the gradient needs to be larger than 0.

$$R(x_j - 1, x_j) = \frac{Y(x_j) - Y(x_j - 1)}{x_j - (x_j - 1)} = Y(x_j) - Y(x_j - 1) \quad \text{(Equation 4)}$$

$$R(x_j, x_j + 1) = \frac{Y(x_j + 1) - Y(x_j)}{(x_j + 1) - x_j} = Y(x_j + 1) - Y(x_j) \quad \text{(Equation 5)}$$

$$0 < R(x_j, x_j - 1) < R(x_j + 1, x_j) \quad \text{(Equation 6)}$$

Further, to also achieve the visual quality of the picture, the gamma curve is preferably close to the conventional gamma curve, that is, the curve of $\gamma=2.2$ ($Y_{org}$). Accordingly, in the present idea, the gamma curve to be newly set is set to have a crossover point $C_p$ with a reference gamma curve function $Y_{org}$ expressed by (Equation 7). When a gray level of the crossover point $C_p$ is $x_p$, $x_p$ is preferably to be between $x_i$ and $x_j$. In this situation, the crossover point $C_p$ eliminates the two points of $(0, Y_{org}(0))$ and $(2^n-1, Y_{org}(2^n-1))$. In (Equation 7), "n" is the number of bits.

$$Y_{org}(x) = \left(\frac{x}{2^n - 1}\right)^{2.2} \quad \text{(Equation 7)}$$

Meanwhile, as described above, in the grayscale ranges previous and next to the grayscale range ($x_i$ to $x_j$) having a gentle gradient (for example, gray levels in FIG. 1 from 0 to $x_i$ and from $x_j$ to 255), the gradient is steeper than the conventional gamma curve. This point can be approximately expressed by mathematical expressions as the following (Equation 8) and (Equation 9). Meanwhile, (Equation 8) expresses the zone of gray level 0 to the gray level $x_i$, and (Equation 9) expresses the zone of gray level $x_j$ to the maximum gray level $x_{max}$.

$$Y(x) = \left(\frac{x}{2^n - 1}\right)^{\gamma} \quad 1.0 < \gamma < 2.2 \quad \text{(Equation 8)}$$

$$Y(x) = \left(\frac{x}{2^n - 1}\right)^{\gamma} \quad 2.2 < \gamma \quad \text{(Equation 9)}$$

Note that, in this situation, at the points of gray levels $x_i$ and $x_j$, it is preferable to satisfy the condition of (Equation 10) below as compared to the conventional gamma curve.

$$Y(x_i) > \left(\frac{x_i}{2^n - 1}\right)^{2.2} \text{ and } Y(x_j) < \left(\frac{x_j}{2^n - 1}\right)^{2.2} \quad \text{(Equation 10)}$$

Next, what is important in the settings of gamma curve is the setting of the grayscale range described above. That is, how to determine $x_i$, $x_j$, and $x_p$. While "a grayscale range" has been mentioned above, the range is preferably to be set as follows.

<2> Determination of Grayscale Range

While the gradient of the gamma curve in a grayscale range is set to be gentler than the conventional gamma curve (curve of $\gamma=2.2$), the grayscale range is determined in the following manner, that is, a method of determining $x_i$, $x_j$, and $x_p$ in FIG. 1.

Figure 5A:
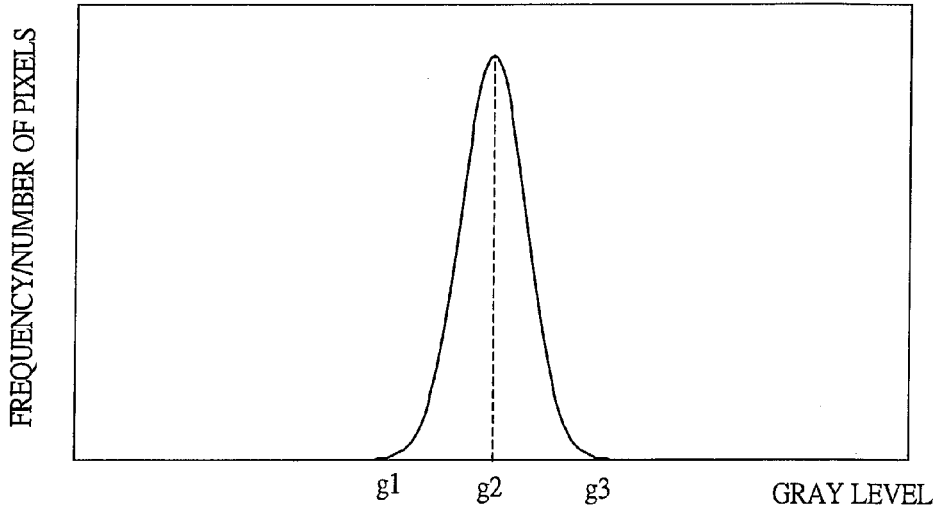
FIG. 5A is a diagram illustrating a method (basic method) of determining a grayscale range in a gamma curve change of the present invention.
Figure 5B:
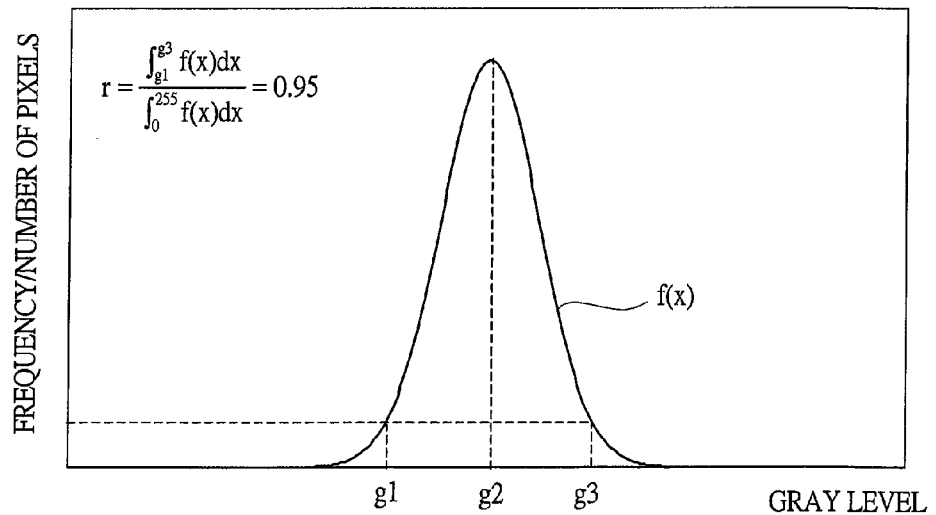
FIG. 5B is a diagram illustrating a method (method using an area ratio) of determining a grayscale range in a gamma curve change of the present invention.

First, from picture data to be displayed, a frequency distribution of grayscale is obtained. An example of the frequency distribution is illustrated in FIGS. 5A and 5B. The horizontal axis is a grayscale, and the vertical axis is frequency in the graphs. The frequency of the vertical axis can be a number of pixels. Normally, as illustrated in FIGS. 5A and 5B, the frequency shows a maximum value at a grayscale (for example, a grayscale g2) in FIGS. 5A and 5B in the distribution. While the distributions are symmetrical in the graphs of FIGS. 5A and 5B, the distributions may be asymmetrical in some cases. In this situation, in the distribution as illustrated in FIG. 5A, a minimum grayscale g1 is $x_i$, a maximum grayscale g3 is $x_j$, and the grayscale g2 having the highest frequency is $x_p$. By using the distribution, the grayscale range of the gamma curve is determined. When the gradient in this grayscale range is smaller than the conventional gamma curve, at least the effect mentioned above can be obtained. Note that, as illustrated in FIG. 1, the curve may be determined such that a relative luminance at the grayscale $x_p$ is set to a conventional relative luminance and the curve is on the point. In this situation, a condition is such that $\gamma$ is larger than 1 and smaller than 2.2 between the gray levels from 0 to $x_i$, and $\gamma$ is larger than 2.2 between the gray levels from $x_j$ to 255. This condition can be expressed as (Equation 10).

As a method of determining a grayscale range, another method will be described with reference to FIG. 5B. Depending on the image, the grayscale frequency distribution is sometimes very broadly expanded (half-value width is large). In such a situation, the grayscale range is wide in the determination of the grayscale range, and thus it is difficult to adjust the gamma curve. Accordingly, the method is, for example, calculating ranges of g1 and g3 to have an area ratio "r" of the frequency distribution being 95% of the whole area and using grayscales obtained from the calculation as the grayscale range. More specifically, when a function of the frequency distribution is expressed as f(x) regarding the grayscale x, the grayscale range is determined by calculating $x_i$ and $x_j$ satisfying the next (Equation 11). Note that a determination of $x_p$ is made in the same manner as described above, and a grayscale at a maximum frequency is $x_p$.

$$r = \frac{\int_{g1}^{g3} f(x)dx}{\int_{0}^{255} f(x)dx} = 0.95 \quad x_i = g1, x_j = g3 \quad \text{(Equation 11)}$$

Figure 6:
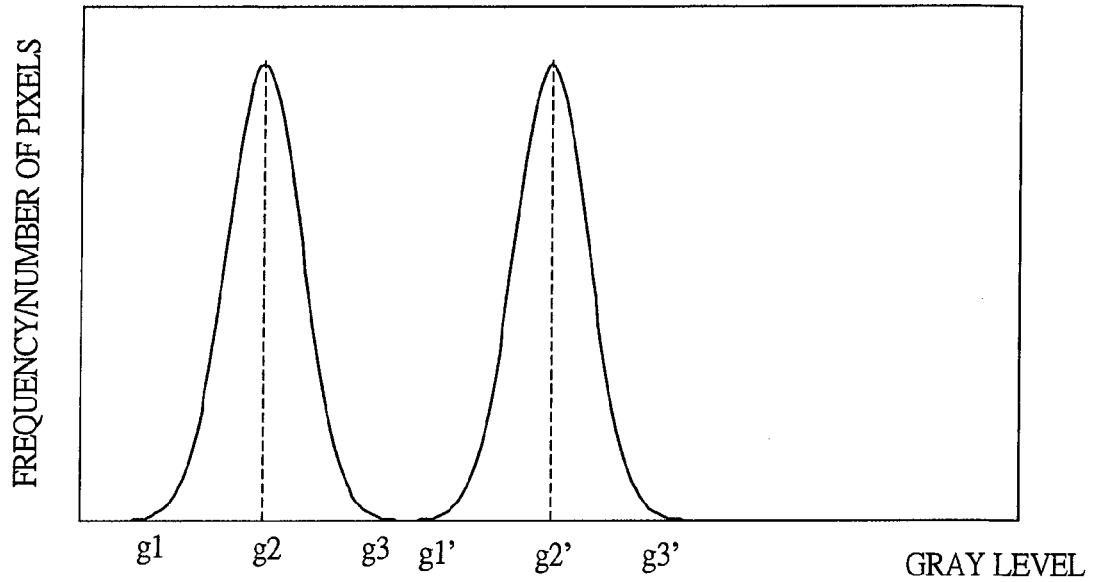
FIG. 6 is a diagram describing a method of determining grayscale ranges in gamma curve changes (when there are a plurality of grayscale frequency distributions) of the present invention.

Also, when illustrating distributions of two groups as illustrated in FIG. 6, g1, g2, g3, g1', g2', g3' are obtained from the distributions following the sequence described above. By using the result, the gamma curve forms two regions having a gentle gradient. That is, as illustrated in FIG. 3, regions having a gentle gradient are provided in the grayscale regions g1 to g3 and g1' to g3'. Further, distributions of a plurality of groups, i.e., three or more groups are illustrated in the same manner. In this manner, the effect described above can be achieved.

Figure 8:
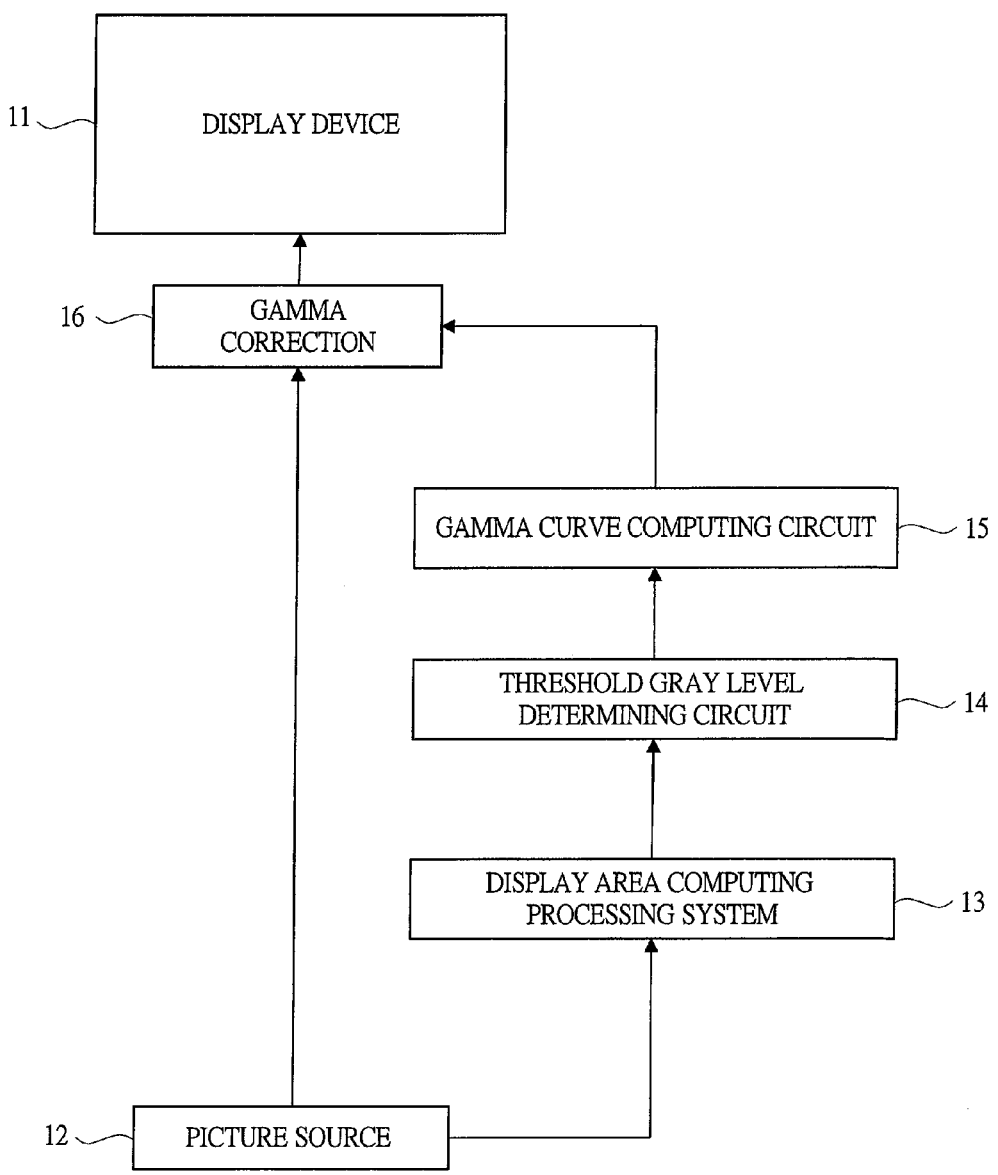
FIG. 8 is a diagram describing a flow and a configuration for determining a gamma curve of an image display device of the present invention.

Note that, the grayscale range determinations can be achieved by introducing a circuit or a system between a display device 11 and a picture source (picture signal source) 12 as illustrated in FIG. 8. More specifically, picture signals from the picture source 12 are processed by a display area computing processing system 13 to cut out a picture of a same/similar chromaticity range, and thereafter, grayscale ranges are determined from a frequency distribution of grayscale by a threshold gray level determining circuit 14 based on the method as described above. Further, a curve being gentler in the grayscale ranges than the conventional curve is calculated by a gamma curve computing circuit 15. Then, the calculated gamma curve is used as a gamma correction 16 of the display device 11, and the effect of improving the color resolution of particular colors can be achieved.

<Range Expansion of Color Range>

As seen from the result of FIG. 15B, a color range of skin (Japanese) actually is largely expanded in a direction. In this situation, it is understood that the chromaticity range is mainly expanded in a u' direction. While the color resolution is improved by providing a region having a gentle gradient to a partial grayscale region of the gamma curve as described above, a dynamic range of the relative luminance becomes smaller and thus an adverse effect is caused such that the range of the chromaticity range becomes a little bit smaller. That is, in FIG. 15B, the expansion in the u' direction is suppressed a little bit upon monitor display. To solve this, it is necessary to take a method of lowering the luminance of one of the three primary colors which has a small effect on the display, the three primary colors forming the image display device. This method will be specifically described with reference to FIGS. 7A and 7B. Note that, the "luminance" here is an absolute value, and "lowering the luminance" means lowering an absolute value of the luminance while the relationship of the gray level and the luminance relative value is being maintained.

Figure 7A:
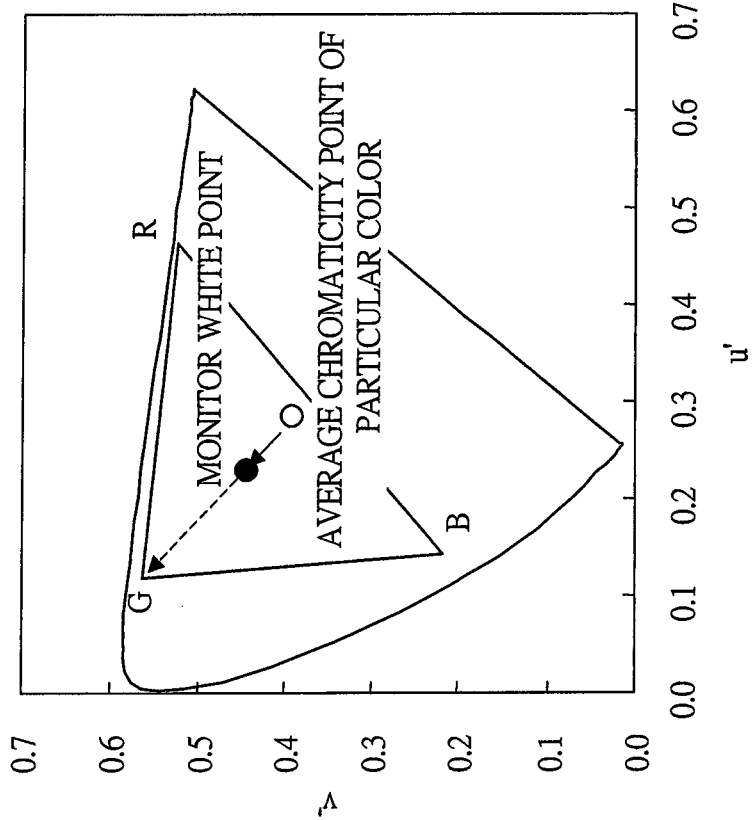
FIG. 7A is a diagram describing a method of obtaining complementary colors (when lowering the luminance of blue) of the present invention.

For example, when displaying images of skin colors of Japanese, the expression is made basically by red (R) and green (G) and the contribution of blue (B) is small. Rather, when the luminance of blue exists, the chromaticity is led to the direction of blue, and thus the expression range of colors (expansion in the u' direction) mentioned above is narrowed. Therefore, by lowering the luminance of blue which has a small effect on the displayed colors among the three primary colors when displaying skin colors, the dynamic range of skin colors is ensured. Actually, as illustrated in FIG. 7A, an average chromaticity of particular colors to be displayed is calculated, and the luminance of a color corresponding to complementary colors of the particular colors is lowered. The complementary colors are colors in an extended direction of a vector (denoted by→on "c") connecting the average chromaticity (u'$_{av}$, v'$_{av}$) and a white point (u'$_w$, v'$_w$), and a color among the three primary colors forming the image display device close to the vector is selected and the light intensity of the selected color is lowered. Blue is the closest to complementary colors of skin colors among the three primary colors.

Figure 7B:
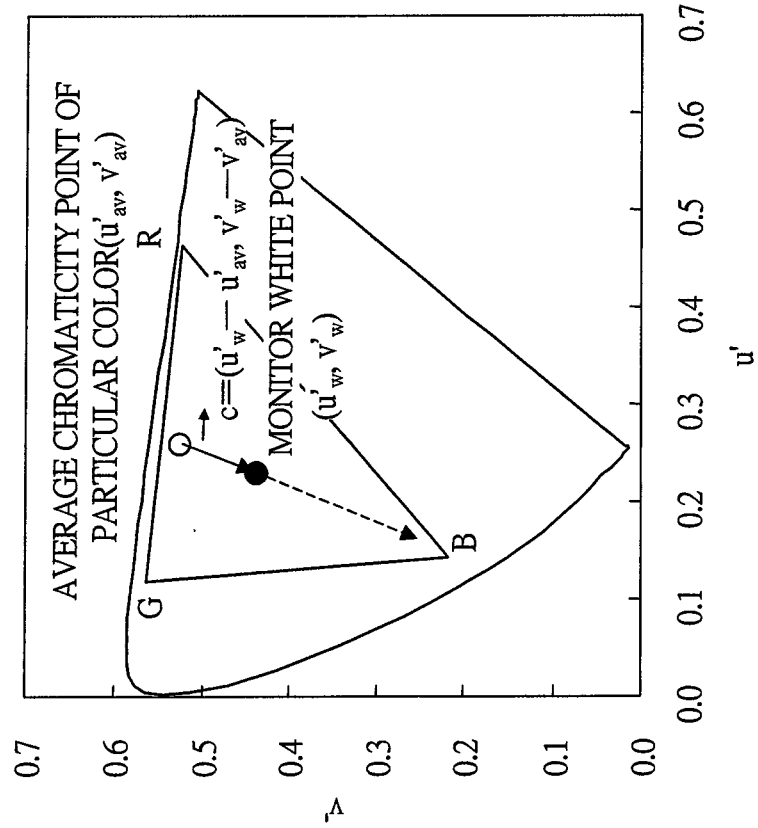
FIG. 7B is a diagram describing a method of obtaining complementary colors (when lowering the luminance of green) of the present invention.

Further, in images for displaying blood vessels, as illustrated in FIG. 7B, it is preferable to lower the luminance of green which corresponds to complementary colors.

By combining the concepts described in the foregoing, both an improvement in the chromatic resolving power (color resolution) of particular colors and securement of a color expression range can be achieved, and realistic colors can be expressed on an image display device.

Figure 9:
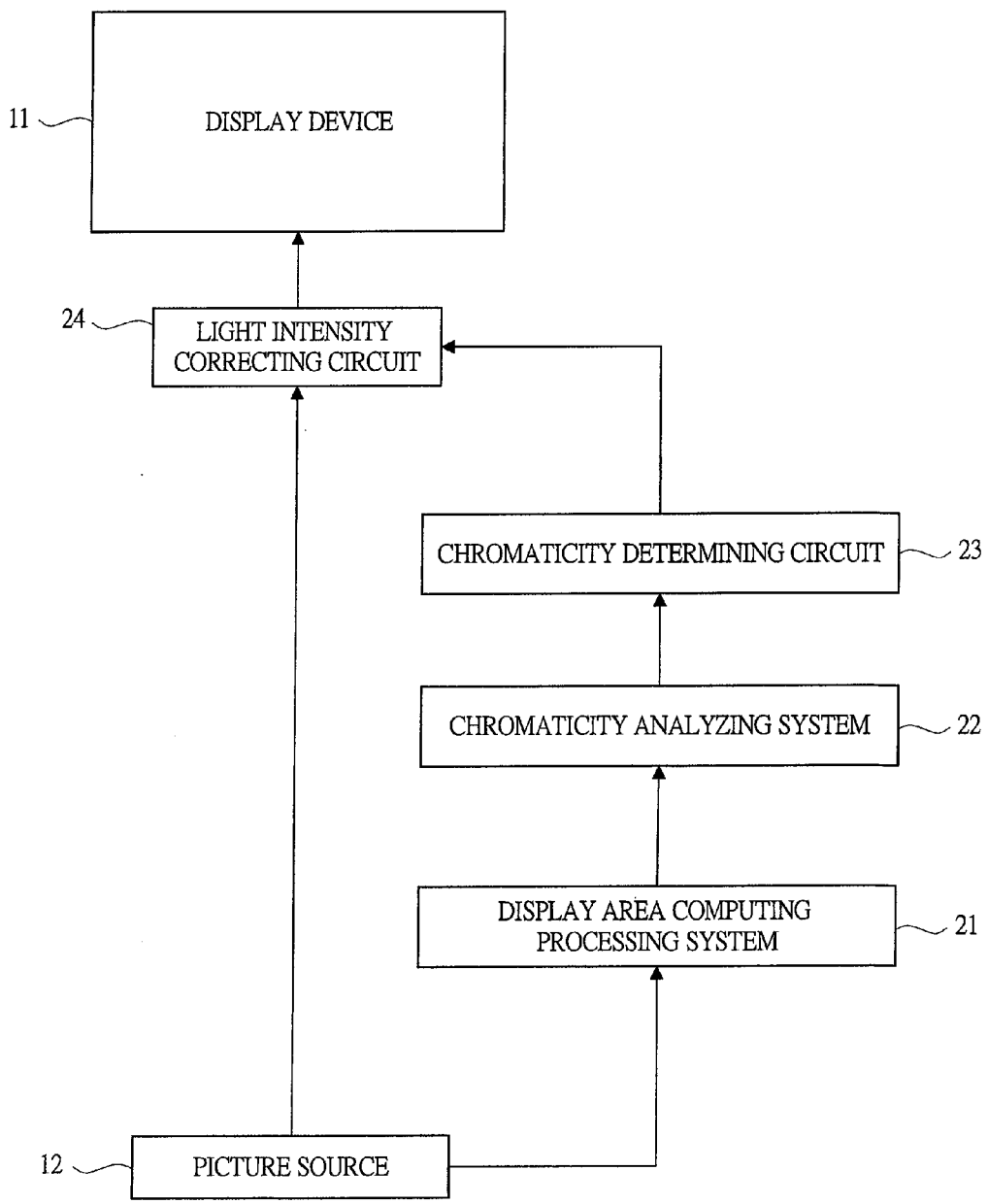
FIG. 9 is a diagram describing a flow and a configuration for calculating complementary colors of the image display device of the present invention.

Note that, when embedding such a system in an image display device, for example, a system and a circuit as illustrated in FIG. 9 are necessary. Based on the data of the image source 12, an image area of particular colors is cut out by the display area computing processing system 21, and a chromaticity analysis regarding the image area is carried out by a chromaticity analysis system 22. Here, calculation of an average chromaticity of the image area and calculation of corresponding chromaticity of complementary colors are carried out. Based on these calculations, a component primary color of the image display device whose luminance should be suppressed is determined by a chromaticity determination circuit 23, and the luminance (output) of the color is suppressed by a light intensity correction circuit 24.

<Other Additional Technology>

Figure 10A:
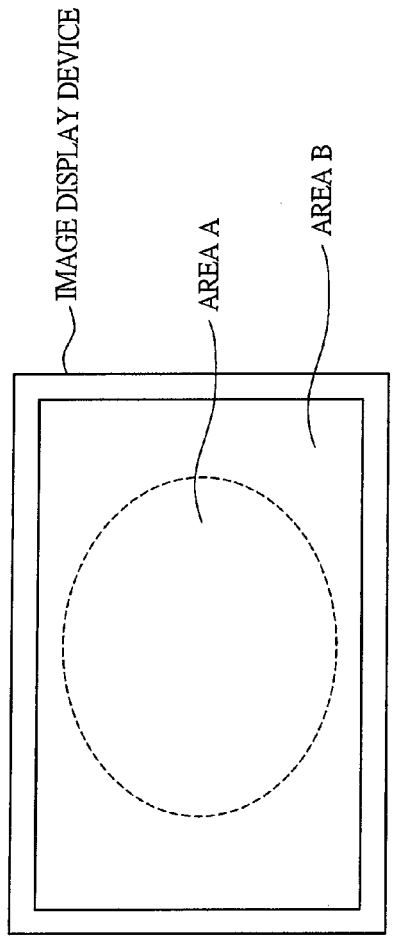
FIG. 10A is a diagram describing a gamma curve of the present invention when setting a gamma curve per display area.
Figure 10C:
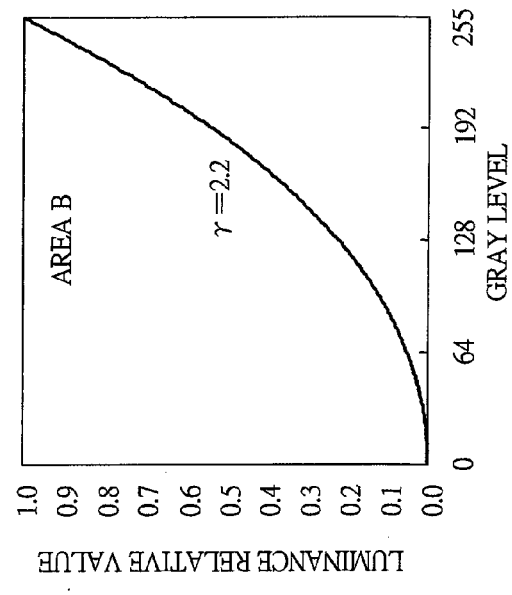
FIG. 10C is a diagram describing a gamma curve of a area B of the present invention.
Figure 10B:
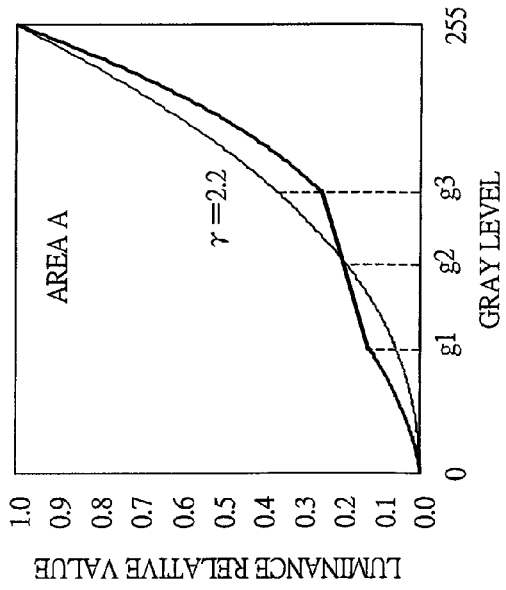
FIG. 10B is a diagram describing a gamma curve of a area A.

In conventional image display devices, the gamma curves have been basically identical in their picture display areas. However, as illustrated in FIG. 10A, for example, an area showing a face of a patient (for example, area A) and an area showing a background of the patient (for example, area B) are possibly largely different in colors to be displayed. In such a situation, as illustrated in FIGS. 10B and 10C, the gamma curves can be set per display area. For example, since a face of a patient is displayed in the area A, a gamma curve as illustrated in FIG. 10B is set by the technology described above, and the conventional gamma curve is set in the area B as illustrated in FIG. 10C. In this manner, an image display without a feeling of strangeness can be achieved.

Specific examples will be described in the embodiments below. Note that the present invention is not particularly limited to the embodiments. While a liquid-crystal display and a plasma display device will be described in the embodiments below, image display devices are not limited to a liquid-crystal display and a plasma display device, and the same concept can be used for a CRT device, an organic EL display device, a projector, etc. as long as the device displays images, and the same effects as an improvement in color resolution of particular colors, an improvement in color expression range, etc. described above can be achieved.

(First Embodiment)

Figure 17:
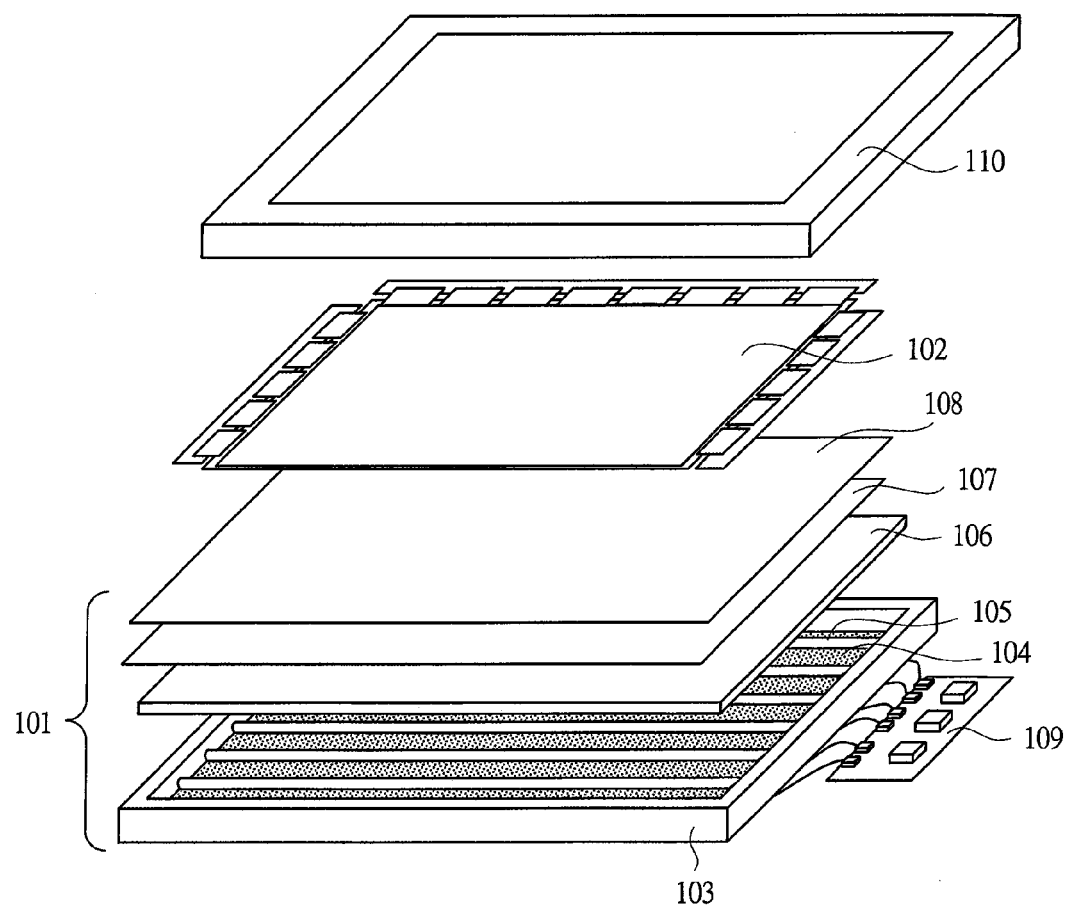
FIG. 17 is a diagram illustrating a schematic structure of a general liquid-crystal display device used in the first and second embodiments of the present invention.

An image display device used in a first embodiment is a liquid-crystal display device. A schematic structure of the liquid-crystal display device is illustrated in FIG. 17. As illustrated in FIG. 17, the liquid-crystal display device is largely formed of a backlight unit 101 and a liquid-crystal panel 102, and the liquid-crystal display device is housed between a chassis 103 on the backlight unit 101 side and a chassis 110 on the liquid-crystal panel 102 side. The backlight unit 101 has a configuration in which a plurality of fluorescent lamps 105 are arranged, and these fluorescent lamps 105 are driven by a driving circuit 109 which includes an inverter etc. Also, a reflector 104 is disposed on the chassis 103 side of the fluorescent lamps 105. The light of the fluorescent lamps 105 are equalized by a diffuser plate 106, a prism sheet 107, a reflective polarizer 108, etc., and then guided to the liquid-crystal panel 102 side. Meanwhile, the liquid crystal panel 102 is formed of a plurality of pixels, and the amount of transmission of the light from the backlight unite 101 is adjusted by the pixels inside the liquid-crystal panel 102. In this manner, an image display is performed.

Also, in recent years, LED (light emitting diode) is being introduced as a light source of the backlight unit 101 in addition to the fluorescent lamp 105. When using LED, the light from the light source is also guided to the liquid-crystal panel side after being subjected to a mixture of color and equalization by a diffuser plate etc.

Using such a liquid-crystal display device as a monitor for remote medical care, a face of a patient is shown mainly as an image. In this situation, first, a picture of the part of a face is cut out and the cut out part is taken as a display area A, and the other area on the background than the cut out part is taken as a display area B. This way is as illustrated in, for example, FIG. 10A.

Figure 11A:
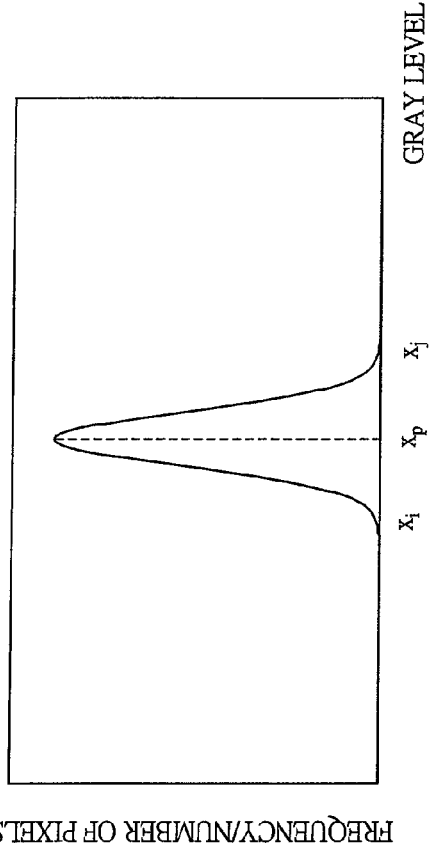
FIG. 11A is a diagram describing a gamma curve of an image display device used in a first embodiment of the present invention for describing a method of determining a grayscale range of a gamma curve change.
Figure 11C:
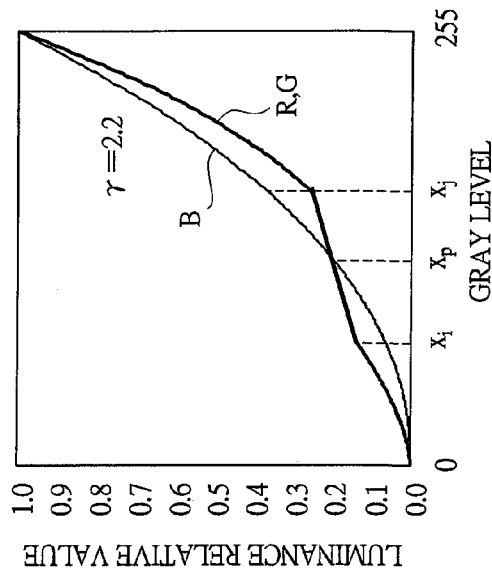
FIG. 11C is a diagram describing a gamma curve of the image display device used in the first embodiment of the present invention for describing a gamma curve.
Figure 11B:
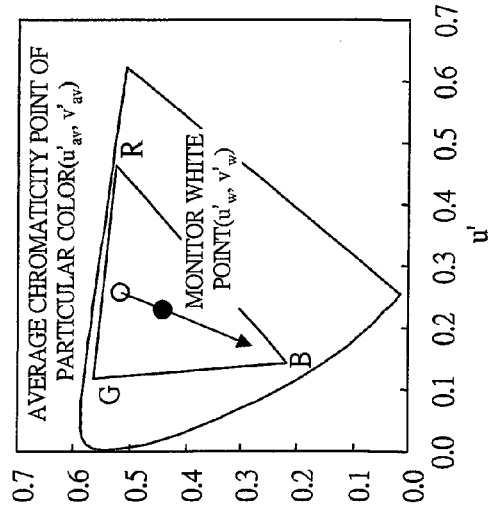
FIG. 11B is a diagram describing a gamma curve of the image display device used in the first embodiment of the present invention for describing a method of obtaining complementary colors.

In the display area A, an average chromaticity is calculated, and also, a grayscale frequency distribution is analyzed as described above, so that the gamma curve illustrated in FIG. 11C is determined (FIGS. 11A and 11B are diagrams for describing a method of determining a grayscale range of a gamma curve change and a method of deriving complementary colors, respectively, as described above). Red (R) and green (G) among the three primary colors are illustrated as a gamma curve illustrated by a bold line in FIG. 11C, and blue (B) is illustrated as the conventional gamma curve illustrated by a thin line. For the sequence of determining the gamma curves, the system described with reference to FIG. 8 is used. In addition, the light intensity of blue to be a complementary color of the skin color from the chromaticity coordinates is lowered. For this intensity lowering, for example, the system described with reference to FIG. 9 is used. By these means, the color resolution of the skin color area can be improved. Further, the color expression range can be wider.

(Second Embodiment)

An image display device used in a second embodiment is a liquid-crystal display device, and being the same as the image display device used in the first embodiment. However, a picture to be displayed is different from that of the first embodiment. Such a liquid-crystal display device is used as a monitor for surgical operation, and blood vessels etc. upon a surgical operation are mainly shown as an image. In this situation, a picture of blood vessels etc. is displayed on in the whole display area.

Figure 12A:
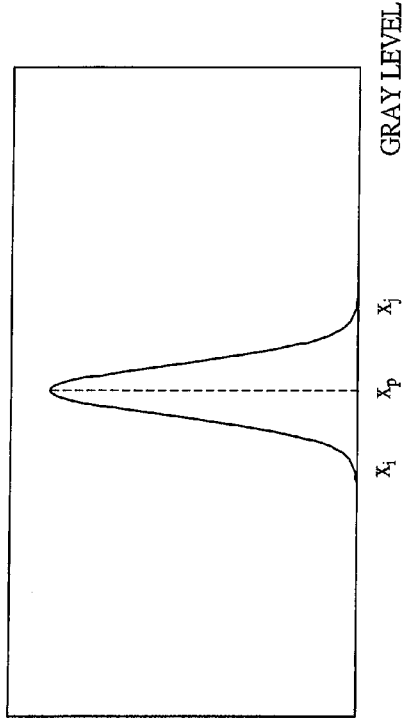
FIG. 12A is a diagram describing a gamma curve of an image display device used in a second embodiment of the present invention for describing a method of determining a grayscale range of a gamma curve change.
Figure 12C:
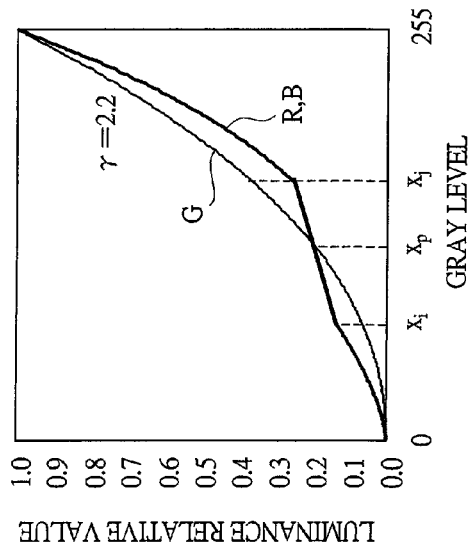
FIG. 12C is a diagram describing a gamma curve of the image display device used in the second embodiment of the present invention for describing a gamma curve.
Figure 12B:
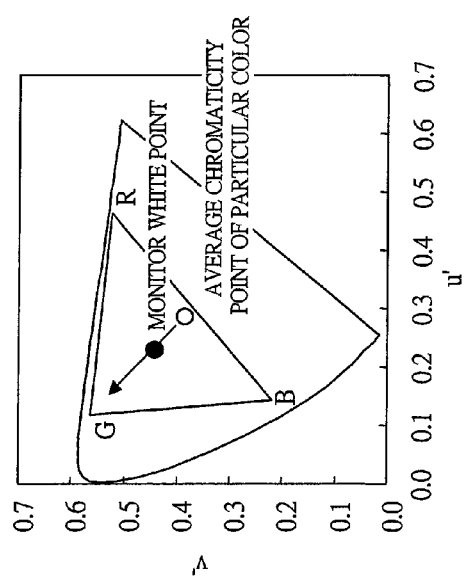
FIG. 12B is a diagram describing a gamma curve of the image display device used in the second embodiment of the present invention for describing a method of obtaining complementary colors.

In the display area, an average chromaticity is calculated, and also, a grayscale frequency distribution is analyzed, so that the gamma curve illustrated in FIG. 12C is determined (FIGS. 12A and 12B are diagrams for describing a grayscale range of a gamma curve change, and a method of deducing complementary colors, respectively, as described above). Red (R) and blue (B) among the three primary colors are illustrated by a gamma curve illustrated by a bold line in FIG. 12C, and green (G) is the conventional gamma curve illustrated by a thin line. And, the light intensity of green (G) to be a complementary color of colors of blood vessels (colors from red to blue) from the chromaticity coordinates is lowered. By these means, as well as improving the color resolution of the blood vessel region, the color expression range can be wider at the same time.

(Third Embodiment)

An image display device used in a third embodiment is a plasma display device. A schematic structure of the plasma display device is illustrated in FIGS. 18A and 18B. FIG. 18A is a perspective view enlarging a part of a display area of the plasma display device, and a cross-sectional view of a V-plane of FIG. 18A is FIG. 18B. The plasma display device is formed of a front glass substrate 201 and a rear glass substrate 205, and has a plurality of pixels. Each pixel is formed of a discharge space 210 sectioned by partition walls 206 called "ribs," a discharge gas filled inside the discharge space 210, a phosphor film 209 surrounding the discharge space 210, and further, an electrode 202 for supplying power which is necessary for discharge. A dielectric 203 is formed on the electrode 202 of the front glass substrate 201, and a passivating film 204 is further formed on the dielectric 203. A dielectric 207 is formed on an address electrode 208 of the rear glass substrate 205.

In the plasma display device, upon displaying, cells to be ON are selected by the address electrode 208, and a voltage corresponding to a picture signal is applied to the electrode 202 to cause a discharge inside the discharge space 210, thereby generating ultraviolet rays from the discharge gas. The ultraviolet rays enter the phosphor film 209, and are converted to visible light. This light is display light.

Such a plasma display device is used as a monitor for surgical operation in the same manner as the first embodiment. In this situation, in the same manner as the first embodiment, the resolution of skin colors of the face part can be improved, and thus subtle differences in color can be expressed.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be used in image display devices represented by a plasma display device and a liquid-crystal display device. Particularly, effects of the present invention are greatly expected to be achieved in medical systems such as a monitor for remote medical care and a monitor for surgical operation which may express particular colors. Moreover, great effects are expected in using the present invention in bi-directional visual systems such as a video-conference system.

FIGS. 1~4B, 13
LUMINANCE RELATIVE VALUE
GRAY LEVEL
FIGS. 5A~6
FREQUENCY/NUMBER OF PIXELS
GRAY LEVEL
FIG. 7A
AVERAGE CHROMATICITY POINT OF PARTICULAR COLOR
MONITOR WHITE POINT
FIG. 7B
MONITOR WHITE POINT
AVERAGE CHROMATICITY POINT OF PARTICULAR COLOR
FIG. 8
11 DISPLAY DEVICE
16 GAMMA CORRECTION
15 GAMMA CURVE COMPUTING CIRCUIT
14 THRESHOLD GRAY LEVEL DETERMINING CIRCUIT
13 DISPLAY AREA COMPUTING PROCESSING SYSTEM
12 IMAGE SOURCE
FIG. 9
11 DISPLAY DEVICE

Figure 15A:
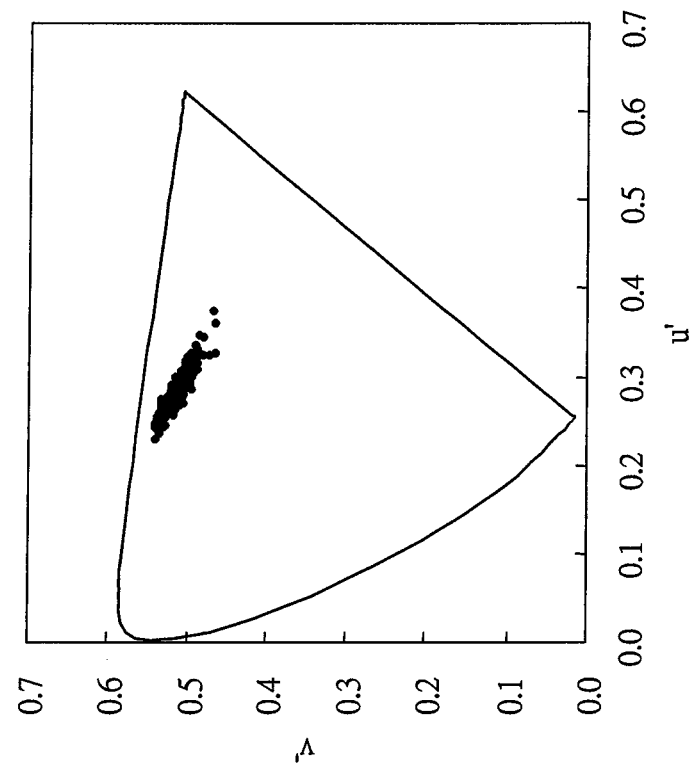
FIG. 15A is a diagram describing chromaticity ranges (chromaticity ranges of colors of skin and colors of blood vessels of Japanese) in a special picture of the general image display device.
Figure 15B:
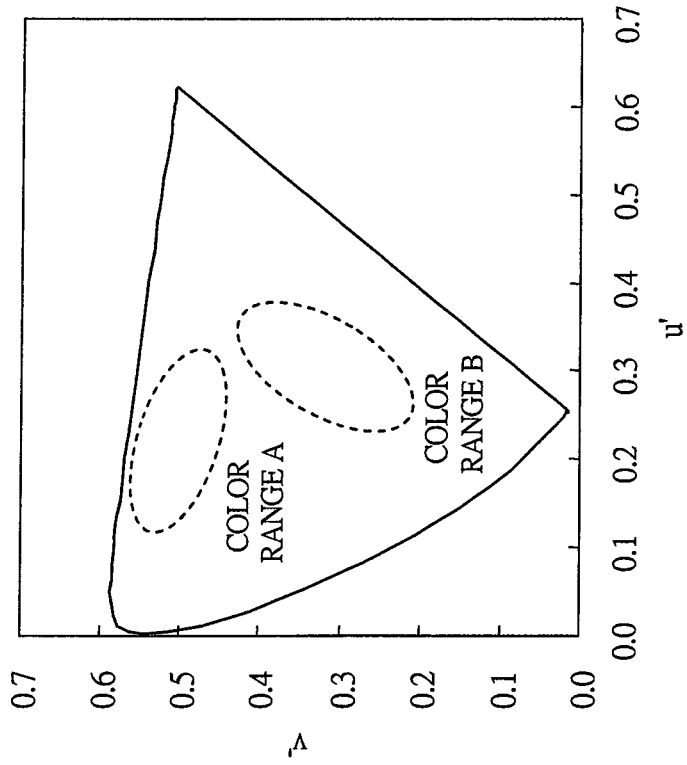
FIG. 15B is a diagram describing a chromaticity range (a result of a chromaticity evaluation of skin colors of Japanese) in the special picture of the general image display device.

24 LIGHT INTENSITY CORRECTING CIRCUIT
23 CHROMATICITY DETERMINING CIRCUIT
22 CHROMATICITY ANALYZING SYSTEM
21 DISPLAY AREA COMPUTING PROCESSING SYSTEM
12 IMAGE SOURCE
FIG. 10A
IMAGE DISPLAY DEVICE
AREA A
AREA B
FIGS. 10B~10C
LUMINANCE RELATIVE VALUE
AREA A/AREA B
GRAY LEVEL
FIGS. 11A, 12A
FREQUENCY/NUMBER OF PIXELS
GRAY LEVEL
FIGS. 11B, 12B
AVERAGE CHROMATICITY POINT OF PARTICULAR COLOR
MONITOR WHITE POINT
FIGS. 11C, 12C
LUMINANCE RELATIVE VALUE
GRAY LEVEL
FIG. 15A
COLOR RANGE A
COLOR RANGE B
FIG. 16
LUMINANCE RELATIVE VALUE
CURVE B
CURVE A
GRAY LEVEL
FIG. 18A
V PLANE
FIG. 18B
CROSS SECTION OF V PLANE

What is claimed is:

1. An image display device displaying a picture using a picture signal from an external device as an input value and using an output value obtained by correcting or converting the input value by a gamma curve, wherein the input value is a gray level x of the image signal (where x is an integer satisfying $0 \leq x \leq 2^n - 1$; where n is a number of bits), and the output value is a luminance relative value $Y(x)$ standardized so that a luminance is 1 at a maximum gray level $x_{max}$ ($=2^n - 1$);

the gray level x and the luminance relative value $Y(x)$ have a relationship determined in a one-on-one manner; and there are at least one or more gray levels $x_i$ satisfying:

$$0 < R(x_i, x_i+1) < R(x_i-1, x_i) \quad \text{(Equation 3)}$$

between a gray level 0 and the maximum gray level $x_{max}$ when defining gradients $R(x_i-1, x_i)$ and $R(x_i, x_i+1)$ according to:

$$R(x_i - 1, x_i) = \frac{Y(x_i) - Y(x_i - 1)}{x_i - (x_i - 1)} = Y(x_i) - Y(x_i - 1) \quad \text{(Equation 1)}$$

and $$R(x_i, x_i + 1) = \frac{Y(x_i + 1) - Y(x_i)}{(x_i + 1) - x_i} = Y(x_i + 1) - Y(x_i); \quad \text{(Equation 2)}$$

the image display device has a gamma curve adjusted to have one or more gray levels $x_j$ satisfying:

$$0 < R(x_j, x_j-1) < R(x_j+1, x_j) \quad \text{(Equation 6)}$$

between the gray level $x_j$ and the maximum gray level $x_{max}$ when defining gradients $R(x_j-1, x_j)$ and $R(x_j, x_j+1)$ according to:

$$R(x_j - 1, x_j) = \frac{Y(x_j) - Y(x_j - 1)}{x_j - (x_j - 1)} = Y(x_j) - Y(x_j - 1) \quad \text{(Equation 4)}$$

and $$R(x_j, x_j + 1) = \frac{Y(x_j + 1) - Y(x_j)}{(x_j + 1) - x_j} = Y(x_j + 1) - Y(x_j); \quad \text{(Equation 5)}$$

and a gamma curve obtained by connecting coordinates of points denoted by the gray level x and the luminance relative value $Y(x)$ in a range of $0 \leq x \leq 2^n - 1$ is crossed with a reference gamma curve $Y_{org}$ expressed by:

$$Y_{org}(x) = \left(\frac{x}{2^n - 1}\right)^{2.2} \quad \text{(Equation 7)}$$

at least one or more points except for $(0, Y_{org}(0))$ and $(2^n-1, Y_{org}(2^n-1))$, wherein the gray level x is an integer, and wherein a point at which the gamma curve and the reference gamma curve $Y_{org}$ cross is taken as a crossover point $C_p$, and a gray level $x_p$ of a coordinate of the crossover point $C_p$ is positioned between the gray level $x_i$ and the gray level $x_j$.

2. An image display device displaying a picture using a picture signal from an external device as an input value and using an output value obtained by correcting or converting the input value by a gamma curve, wherein the input value is a gray level x of the image signal (where x is an integer satisfying $0 \leq x \leq 2^n - 1$; where n is a number of bits), and the output value is a luminance relative value $Y(x)$ standardized so that a luminance is 1 at a maximum gray level $x_{max}$ ($=2^n - 1$);

the gray level x and the luminance relative value $Y(x)$ have a relationship determined in a one-on-one manner; and there are at least one or more gray levels $x_i$ satisfying:

$$0 < R(x_i, x_i+1) < R(x_i-1, x_i) \quad \text{(Equation 3)}$$

between a gray level 0 and the maximum gray level $x_{max}$ when defining gradients $R(x_i-1, x_i)$ and $R(x_i, x_i+1)$ according to:

$$R(x_i - 1, x_i) = \frac{Y(x_i) - Y(x_i - 1)}{x_i - (x_i - 1)} = Y(x_i) - Y(x_i - 1) \quad \text{(Equation 1)}$$

and $$R(x_i, x_i + 1) = \frac{Y(x_i + 1) - Y(x_i)}{(x_i + 1) - x_i} = Y(x_i + 1) - Y(x_i); \quad \text{(Equation 2)}$$

the image display device has a gamma curve adjusted to have one or more gray levels $x_j$ satisfying:

$$0 < R(x_j, x_j-1) < R(x_j+1, x_j) \quad \text{(Equation 6)}$$

between the gray level $x_j$ and the maximum gray level $x_{max}$ when defining gradients $R(x_j-1, x_j)$ and $R(x_j, x_j+1)$ according to:

$$R(x_j - 1, x_j) = \frac{Y(x_j) - Y(x_j - 1)}{x_j - (x_j - 1)} = Y(x_j) - Y(x_j - 1) \quad \text{(Equation 4)}$$

and $$R(x_j, x_j + 1) = \frac{Y(x_j + 1) - Y(x_j)}{(x_j + 1) - x_j} = Y(x_j + 1) - Y(x_j); \quad \text{(Equation 5)}$$

and a gamma curve obtained by connecting coordinates of points denoted by the gray level x and the luminance relative value Y(x) in a range of $0 \leq x \leq 2^n - 1$ is crossed with a reference gamma curve $Y_{org}$ expressed by:

$$Y_{org}(x) = \left(\frac{x}{2^n - 1}\right)^{2.2} \quad \text{(Equation 7)}$$

at least one or more points except for $(0, Y_{org}(0))$ and $(2^n - 1, Y_{org}(2^n - 1))$, wherein the gray level x is an integer, and wherein the gamma curve is expressed by a function of $$Y(x) = \left(\frac{x}{2^n - 1}\right)^{\gamma} \quad 1.0 < \gamma < 2.2 \quad \text{(Equation 8)}$$

in a zone from a gray level 0 to the gray level $x_i$.

3. The image display device according to claim 1, wherein the gamma curve denoting a relationship of the gray level x and the luminance relative value Y(x) is set in each of a plurality of component primary colors of an image display, and a gamma curve of at least one primary color among the component primary colors is adjusted.

4. The image display device according to claim 1, wherein the gamma curve denoting a relationship of the gray level x and the luminance relative value Y(x) is set in each of a plurality of display areas in which an image is displayed corresponding to the picture signal, and a gamma curve of at least one display area among the display areas is adjusted.

5. The image display device according to claim 1, wherein a display area in which a particular color range is cut out using the picture signal from the external device; and an average chromaticity in the display area is calculated and a light intensity of a component primary color of the image display device being closest to a complementary chromaticity that is complementary to the average chromaticity is reduced to be smaller than light intensities of other component primary colors of the image display device.

6. The image display device according to claim 1, comprising:

a display area computing processing system which cuts out a display area in which a particular color range is displayed using the picture signal of the external device;

a threshold gray level determination circuit which performs a frequency analysis of gray levels in the display area which has been cut out, determines threshold gray levels calculated from the frequency analysis, and sets the threshold gray levels to the gray level $x_i$ and the gray level $x_j$, respectively; and a gamma curve computing circuit which modulates a gradient of a gamma curve in a zone of the threshold gray levels which have been calculated, and determines a gamma curve at every gray level.

7. The image display device according to claim 1, comprising:

a display area computing processing system which cuts out a display area in which a particular color range is displayed using the picture signal of the external device;

a chromaticity analysis system which performs a chromaticity analysis in the display area which has been cut out, and calculates an average chromaticity of the display area and a complementary chromaticity corresponding to the average chromaticity;

a chromaticity determination circuit which determines a component primary color of the image display device closest to the complementary chromaticity which has been calculated; and a light intensity correction circuit which modulates a light intensity of the component primary color which has been determined and reduces the light intensity.

8. An image display device displaying a picture using a picture signal from an external device as an input value and using an output value obtained by correcting or converting the input value by a gamma curve, wherein the input value is a gray level x of the image signal (where x is an integer satisfying $0 \leq x \leq 2^n - 1$; where n is a number of bits), and the output value is a luminance relative value Y(x) standardized so that a luminance is 1 at a maximum gray level $x_{max}$ ($=2^n - 1$);

the gray level x and the luminance relative value Y(x) have a relationship determined in a one-on-one manner; and there are at least one or more gray levels $x_i$ satisfying:

$$0 < R(x_i, x_i + 1) < R(x_i - 1, x_i) \quad \text{(Equation 3)}$$

between a gray level 0 and the maximum gray level $x_{max}$ when defining gradients $R(x_i - 1, x_i)$ and $R(x_i, x_i + 1)$ according to:

$$R(x_i - 1, x_i) = \frac{Y(x_i) - Y(x_i - 1)}{x_i - (x_i - 1)} = Y(x_i) - Y(x_i - 1) \quad \text{(Equation 1)}$$

and $$R(x_i, x_i + 1) = \frac{Y(x_i + 1) - Y(x_i)}{(x_i + 1) - x_i} = Y(x_i + 1) - Y(x_i); \quad \text{(Equation 2)}$$

the image display device has a gamma curve adjusted to have one or more gray levels $x_j$ satisfying:

$$0 < R(x_j, x_j - 1) < R(x_j + 1, x_j) \quad \text{(Equation 6)}$$

between the gray level $x_j$ and the maximum gray level $x_{max}$ when defining gradients $R(x_j - 1, x_j)$ and $R(x_j, x_j + 1)$ according to:

$$R(x_j - 1, x_j) = \frac{Y(x_j) - Y(x_j - 1)}{x_j - (x_j - 1)} = Y(x_j) - Y(x_j - 1) \quad \text{(Equation 4)}$$

and $$R(x_j, x_j + 1) = \frac{Y(x_j + 1) - Y(x_j)}{(x_j + 1) - x_j} = Y(x_j + 1) - Y(x_j); \quad \text{(Equation 5)}$$

and a gamma curve obtained by connecting coordinates of points denoted by the gray level x and the luminance relative value Y(x) in a range of $0 \leq x \leq 2^n - 1$ is crossed with a reference gamma curve $Y_{org}$ expressed by:

$$Y_{org}(x) = \left(\frac{x}{2^n - 1}\right)^{2.2} \quad \text{(Equation 7)}$$

at least one or more points except for $(0, Y_{org}(0))$ and $(2^n-1, Y_{org}(2^n-1))$, wherein the gray level x is an integer, and wherein the gamma curve satisfies $$Y(x_i) > \left(\frac{x_i}{2^n - 1}\right)^{2.2} \text{ and } Y(x_j) < \left(\frac{x_j}{2^n - 1}\right)^{2.2} \quad \text{(Equation 10)}$$

at the gray level $x_i$ and the gray level $x_j$.

* * * * *